United States Patent
Dickie (10) Patent No.: US 10,671,044 B2
(45) Date of Patent: Jun. 2, 2020

(54) APPARATUS AND METHOD FOR SYNCHRONIZATION OF CONTROL LOGIC OF A CONTROLLER VIA A NETWORK

(75) Inventor: Kenneth Pierson Dickie, Edmonton (CA)

(73) Assignee: GE INTELLIGENT PLATFORMS INC.

(*) Notice: Subject to any disclaimer, the term of this patent is extended or adjusted under 35 U.S.C. 154(b) by 477 days.

(21) Appl. No.: 14/376,539

(22) PCT Filed: Jun. 29, 2012

(86) PCT No.: PCT/US2012/044759
§ 371 (c)(1),
(2), (4) Date: Dec. 3, 2014

(87) PCT Pub. No.: WO2013/103380
PCT Pub. Date: Jul. 11, 2013

(65) Prior Publication Data
US 2015/0120012 A1    Apr. 30, 2015

Related U.S. Application Data

(60) Provisional application No. 61/583,956, filed on Jan. 6, 2012.

(51) Int. Cl.
*G05B 19/42* (2006.01)
*G05B 19/05* (2006.01)
(Continued)

(52) U.S. Cl.
CPC ....... *G05B 19/056* (2013.01); *G05B 19/0426* (2013.01); *G05B 19/054* (2013.01);
(Continued)

(58) Field of Classification Search
None
See application file for complete search history.

(56) References Cited

U.S. PATENT DOCUMENTS 5,530,643 A    6/1996   Hodorowski
5,870,537 A    2/1999   Kern et al.
(Continued)

FOREIGN PATENT DOCUMENTS

CN    1363072 A    8/2002
CN    1857877 A    11/2006
(Continued)

OTHER PUBLICATIONS

Cunning et al., "Automatic Test Case Generation from Requirements Specifications for Real-time Embedded Systems", vol. No. 5, pp. 784-789, 1999.
(Continued)

*Primary Examiner* — Wissam Rashid
(74) *Attorney, Agent, or Firm* — Marshall, Gerstein & Borun LLP (57) ABSTRACT

Approaches are provided whereby synchronization is achieved between control logic at an automation controller and a representation of this logic at a communication network. Control logic is initially deployed to an automatic controller and a representation of this control logic is stored at the communication network. The automation controller is located remotely from the network. When a change is made to the representation of the control logic at the network, the control logic is re-deployed to the automation controller so that the operator of the control logic is synchronized to the representation. The synchronization is effective to allow a service center to remotely service the control logic without the need for traveling to the automation controller.

16 Claims, 4 Drawing Sheets

(51) Int. Cl.
*G05B 19/042* (2006.01)
*G05B 23/02* (2006.01)
*G06Q 30/00* (2012.01)

(52) U.S. Cl.
CPC ....... *G05B 23/0243* (2013.01); *G06Q 30/016* (2013.01); *G05B 2219/1204* (2013.01)

(56) References Cited

U.S. PATENT DOCUMENTS

| | | |
|---|---|---|
| 6,353,926 B1 | 3/2002 | Parthesarathy et al. |
| 6,445,963 B1 | 9/2002 | Blevins et al. |
| 6,449,624 B1* | 9/2002 | Hammack .......... G05B 19/0426 |
| 6,567,937 B1 | 5/2003 | Flores et al. |
| 6,704,735 B1 | 3/2004 | Salo et al. |
| 6,799,080 B1 | 9/2004 | Hylden et al. |
| 6,882,890 B2 | 4/2005 | Horn et al. |
| 6,904,449 B1 | 6/2005 | Quinones |
| 7,103,647 B2 | 9/2006 | Aziz |
| 7,127,330 B2 | 10/2006 | Spool et al. |
| 7,143,186 B2 | 11/2006 | Stewart et al. |
| 7,246,078 B2 | 7/2007 | Vincent |
| 7,257,620 B2 | 8/2007 | Lo |
| 7,290,244 B2 | 10/2007 | Peck et al. |
| 7,318,044 B2 | 1/2008 | Matsuoka et al. |
| 7,330,473 B1 | 2/2008 | Baier et al. |
| 7,392,421 B1 | 6/2008 | Bloomstein et al. |
| 7,401,059 B1 | 7/2008 | Owen et al. |
| 7,523,045 B1 | 4/2009 | Walker et al. |
| 7,634,757 B2 | 12/2009 | De et al. |
| 7,738,975 B2 | 6/2010 | Denison et al. |
| 7,747,404 B2 | 6/2010 | Meckelburg et al. |
| 7,778,883 B2 | 8/2010 | Albazz et al. |
| 7,860,609 B2 | 12/2010 | Yanagita et al. |
| 7,861,223 B1 | 12/2010 | Schmidt et al. |
| 7,870,223 B2 | 1/2011 | Grgic et al. |
| 7,908,194 B2 | 3/2011 | Hollas |
| 7,912,560 B2 | 3/2011 | Hood et al. |
| 7,958,013 B2 | 6/2011 | Porat et al. |
| 7,970,830 B2 | 6/2011 | Staggs et al. |
| 8,015,373 B2 | 9/2011 | Ballard et al. |
| 8,015,546 B2 | 9/2011 | Jones et al. |
| 8,024,732 B2 | 9/2011 | Sheehan et al. |
| 8,121,707 B2 | 2/2012 | Karaffa et al. |
| 8,468,335 B2 | 6/2013 | Lin et al. |
| 8,584,114 B2 | 11/2013 | Rabinovich et al. |
| 2002/0004709 A1 | 1/2002 | Peter et al. |
| 2002/0029377 A1 | 3/2002 | Pavela |
| 2002/0049625 A1 | 4/2002 | Kilambi et al. |
| 2003/0063013 A1 | 4/2003 | Jin et al. |
| 2003/0076353 A1 | 4/2003 | Blackstock et al. |
| 2003/0163212 A1 | 8/2003 | Smith et al. |
| 2003/0204784 A1 | 10/2003 | Jorapur |
| 2003/0216986 A1 | 11/2003 | Hassan |
| 2005/0011967 A1 | 1/2005 | Skelton-Becker et al. |
| 2005/0132055 A1 | 6/2005 | Neogi |
| 2005/0132064 A1 | 6/2005 | Lo |
| 2005/0138111 A1 | 6/2005 | Aton et al. |
| 2005/0278577 A1 | 12/2005 | Doong et al. |
| 2006/0036876 A1 | 2/2006 | Kitada |
| 2006/0036907 A1 | 2/2006 | Inscoe et al. |
| 2006/0064183 A1 | 3/2006 | Chandhoke |
| 2006/0089886 A1 | 4/2006 | Wong |
| 2006/0095855 A1 | 5/2006 | Britt et al. |
| 2006/0235594 A1 | 10/2006 | Knoefler et al. |
| 2006/0245564 A1 | 11/2006 | Li et al. |
| 2007/0005266 A1 | 1/2007 | Blevins et al. |
| 2007/0074280 A1 | 3/2007 | Callaghan et al. |
| 2007/0094541 A1 | 4/2007 | Kang |
| 2007/0118345 A1 | 5/2007 | Olesen et al. |
| 2007/0208435 A1 | 9/2007 | Schott |
| 2008/0141238 A1 | 6/2008 | Balassanian |
| 2008/0154909 A1 | 6/2008 | Dam et al. |
| 2008/0208380 A1 | 8/2008 | Taylor |
| 2008/0222604 A1 | 9/2008 | Murphy |
| 2008/0243311 A1 | 10/2008 | Dahmer et al. |
| 2008/0244449 A1 | 10/2008 | Morrison et al. |
| 2008/0250045 A1 | 10/2008 | Balassanian et al. |
| 2009/0012631 A1 | 1/2009 | Fuller |
| 2009/0037008 A1 | 2/2009 | Moorer et al. |
| 2009/0063650 A1 | 3/2009 | Anslow et al. |
| 2009/0144108 A1 | 6/2009 | Cloud |
| 2009/0204458 A1 | 8/2009 | Wiese et al. |
| 2009/0217163 A1 | 8/2009 | Jaroker |
| 2009/0265694 A1 | 10/2009 | Bakowski |
| 2009/0300149 A1 | 12/2009 | Ferris et al. |
| 2009/0300423 A1 | 12/2009 | Ferris |
| 2010/0023600 A1 | 1/2010 | Hill et al. |
| 2010/0023918 A1 | 1/2010 | Bernardini et al. |
| 2010/0082844 A1 | 4/2010 | Stoupis et al. |
| 2010/0088150 A1 | 4/2010 | Mazhar et al. |
| 2010/0131624 A1 | 5/2010 | Ferris |
| 2010/0138017 A1 | 6/2010 | Vrba et al. |
| 2010/0223157 A1 | 9/2010 | Kalsi |
| 2010/0278336 A1 | 11/2010 | Tahan et al. |
| 2010/0306379 A1 | 12/2010 | Ferris |
| 2010/0318665 A1 | 12/2010 | Demmer et al. |
| 2011/0004685 A1* | 1/2011 | De Groot .......... G05B 19/0425 |
| | | 709/225 |
| 2011/0022626 A1 | 1/2011 | Plache et al. |
| 2011/0022827 A1 | 1/2011 | Plache et al. |
| 2011/0117845 A1 | 5/2011 | Kirsch et al. |
| 2011/0126168 A1 | 5/2011 | Ilyayev |
| 2011/0145439 A1 | 6/2011 | Chaturvedi et al. |
| 2011/0154092 A1 | 6/2011 | Dash et al. |
| 2011/0154451 A1 | 6/2011 | Thomas |
| 2011/0179154 A1 | 7/2011 | Ravichandran et al. |
| 2011/0191181 A1 | 8/2011 | Blackhurst et al. |
| 2011/0191500 A1 | 8/2011 | Odayappan et al. |
| 2011/0197097 A1 | 8/2011 | Beaty et al. |
| 2011/0202901 A1 | 8/2011 | Givoni et al. |
| 2011/0208606 A1 | 8/2011 | Hadar et al. |
| 2011/0208695 A1 | 8/2011 | Anand et al. |
| 2011/0231670 A1 | 9/2011 | Shevchenko et al. |
| 2011/0231818 A1 | 9/2011 | Steden |
| 2011/0238458 A1 | 9/2011 | Purcell et al. |
| 2011/0246721 A1 | 10/2011 | Crisan |
| 2011/0264550 A1 | 10/2011 | Fair |
| 2011/0271278 A1 | 11/2011 | Dittrich |
| 2011/0282476 A1 | 11/2011 | Hegemier et al. |
| 2011/0282940 A1 | 11/2011 | Zhang et al. |
| 2011/0314168 A1 | 12/2011 | Bathiche et al. |
| 2012/0010488 A1 | 1/2012 | Henry et al. |
| 2012/0109384 A1 | 5/2012 | Stepanian |
| 2012/0131176 A1 | 5/2012 | Ferris et al. |
| 2012/0143767 A1 | 6/2012 | Abadir et al. |
| 2012/0158972 A1 | 6/2012 | Gammill et al. |
| 2012/0185821 A1 | 7/2012 | Yaseen et al. |
| 2013/0024542 A1 | 1/2013 | Keller et al. |
| 2013/0024572 A1 | 1/2013 | Chen |
| 2013/0096727 A1 | 4/2013 | Brandt et al. |
| 2013/0124465 A1 | 5/2013 | Pingel et al. |
| 2013/0211546 A1 | 8/2013 | Lawson et al. |
| 2013/0211555 A1 | 8/2013 | Lawson et al. |
| 2013/0211559 A1 | 8/2013 | Lawson et al. |
| 2013/0212129 A1 | 8/2013 | Lawson et al. |
| 2013/0212420 A1 | 8/2013 | Lawson et al. |
| 2013/0282180 A1 | 10/2013 | Layton et al. |
| 2014/0047064 A1 | 2/2014 | Maturana et al. |
| 2014/0047107 A1 | 2/2014 | Maturana et al. |
| 2014/0058535 A1 | 2/2014 | Dickie |
| 2015/0066979 A1 | 3/2015 | Zhang et al. |

FOREIGN PATENT DOCUMENTS

| | | |
|---|---|---|
| CN | 1862477 A | 11/2006 |
| CN | 101083657 A | 12/2007 |
| CN | 101196740 A | 6/2008 |
| CN | 101208674 A | 6/2008 |
| CN | 101782893 A | 7/2010 |
| CN | 101958805 A | 1/2011 |
| CN | 102105861 A | 6/2011 |
| EP | 1296232 A2 | 3/2003 |
| EP | 1742125 A2 | 1/2007 |
| EP | 1814036 A2 | 8/2007 |

(56) References Cited

FOREIGN PATENT DOCUMENTS

| EP | 2040135 A2 | 3/2009 |
|---|---|---|
| EP | 2237120 A2 | 10/2010 |
| EP | 2592812 A2 | 5/2013 |
| WO | 0075826 A1 | 12/2000 |
| WO | 0159642 A1 | 8/2001 |
| WO | 0228125 A2 | 4/2002 |
| WO | 2013103381 A1 | 7/2013 |

OTHER PUBLICATIONS

Husain et al., "Remote device management of WiMAX devices in multi-mode multi-access environment", pp. 1-13, Mar. 31-Apr. 2, 2008.
"Knowledge as a Service (KaaS) Enables the Right Action, Right Now", Cumulus IQ: Knowledge as a Service, 2009.
Altmann et al., "A Marketplace and its Market Mechanism for Trading Commoditized Computing Resources", TEMEP Discussion Paper, Mar. 2010.
Ranchal et al., "Protection of Identity Information in Cloud Computing without Trusted Third Party", 2010 29th IEEE Symposium on Reliable Distributed Systems, pp. 368-372, 2010.
"Top ten advantages of Google's cloud", Google Apps for Business, 2011.
Salves, "Timeline Cloud Family Edition Reviewed", Pudai LLC, Jul. 18, 2011.
Arefin et al., "CloudInsight: Shedding Light on the Cloud", 30th IEEE International Symposium on Reliable Distributed Systems, pp. 219-228, Oct. 4-7, 2011.
International Search Report and Written Opinion issued in connection with related PCT Application No. PCT/US2012/044767 dated Sep. 19, 2012.
International Search Report and Written Opinion issued in connection with related PCT Application No. PCT/US2012/044770 dated Sep. 19, 2012.
International Search Report and Written Opinion issued in connection with related PCT Application No. PCT/US2012/044766 dated Oct. 17, 2012.
European Office Action issued in connection with related EP Application No. 12735996.6 dated May 28, 2015.
European Office Action issued in connection with related EP Application No. 12737949.3 dated May 28, 2015.
European Office Action issued in connection with related EP Application No. 12738292.7 dated May 28, 2015.
Unofficial English Translation of Chinese Office Action issued in connection with corresponding CN Application No. 201280071226.X dated Nov. 24, 2015.
Unofficial English Translation of Chinese Office Action issued in connection with related CN Application No. 201280071178.4 dated Dec. 21, 2015.
Unofficial English Translation of Chinese Office Action issued in connection with related CN Application No. 201280071182.0 dated Dec. 31, 2015.
Xianjin, et al., "File Synchronization of Multi-Machine System Design and Implementation Based Cloud Storage", Computer Science and Service System (CSSS), 2011 International Conference, On page(s): 1275-1278, Issue Date: Jun. 27-29, 2011.
Search Report issued in connection with corresponding PCT Application PCT/US2012/044759 dated Sep. 19, 2012.
Soon et al., Test Strategy and Automation for Complex Systems, dated Mar. 1, 2007, IP.com Prior Art Database Technical Disclosure, IP. com No. IPCOM000147528D, Mar. 1, 2007.
IBM, "Method of Creating a Componentized Architecture for Unifying Resource Sharing Scenarios in Cloud Computing Environment", Prior Art Database Disclosure, pp. 1-13, Feb. 11, 2010.
Zexi et al., "An Optimal Hysteretic Control Policy for Energy Saving in Cloud Computing", Global Telecommunications Conference, pp. 1-5, 2011.
International Search Report and Written Opinion issued in connection with related Application No. PCT/US2013/048529 dated Oct. 4, 2013.
U.S. Non-Final Office Action issued in connection with related U.S. Appl. No. 13/760,748 dated Feb. 11, 2014.
U.S. Final Office Action issued in connection with related U.S. Appl. No. 13/760,748 dated Oct. 28, 2014.
U.S. Non-Final Office Action issued in connection with related U.S. Appl. No. 13/760,672 dated Apr. 28, 2015.
U.S. Non-Final Office Action issued in connection with related U.S. Appl. No. 13/760,748 dated May 6, 2015.
U.S. Final Office Action issued in connection with related U.S. Appl. No. 13/760,748 dated Sep. 1, 2015.
U.S. Non-Final Office Action issued in connection with related U.S. Appl. No. 13/760,204 dated Oct. 15, 2015.
U.S. Non-Final Office Action issued in connection with related U.S. Appl. No. 13/760,748 dated Jan. 12, 2016.
U.S. Final Office Action issued in connection with related U.S. Appl. No. 13/760,204 dated Feb. 20, 2016.
U.S. Non-Final Office Action issued in connection with related U.S. Appl. No. 13/760,672 dated Mar. 1, 2016.
U.S. Final Office Action issued in connection with related U.S. Appl. No. 13/760,672 dated Jun. 14, 2016.
U.S. Non-Final Office Action issued in connection with related U.S. Appl. No. 13/760,204 dated Jul. 21, 2016.
U.S. Notice of Allowance issued in connection with related U.S. Appl. No. 13/760,748 dated Aug. 4, 2016.
U.S. Non-Final Office Action issued in connection with related U.S. Appl. No. 13/760,672 dated Sep. 26, 2016.
U.S. Final Office Action issued in connection with related U.S. Appl. No. 13/760,204 dated Dec. 20, 2016.
U.S. Final Office Action issued in connection with related U.S. Appl. No. 13/760,672 dated Jan. 27, 2017.
U.S. Non-Final Office Action issued in connection with related U.S. Appl. No. 14/376,958 dated Jun. 2, 2017.

* cited by examiner

APPARATUS AND METHOD FOR SYNCHRONIZATION OF CONTROL LOGIC OF A CONTROLLER VIA A NETWORK

CROSS REFERENCES TO RELATED APPLICATIONS

This application claims priority to U.S. Provisional Application Ser. No. 61/583,956, filed on Jan. 6, 2012, the contents of which are incorporated herein by reference in its entirety.

PCT International application No. PCT/US2012/044766, entitled "Method and Apparatus for Network Based Testing" and published as WO/2013/103381;

PCT International application No. PCT/US2012/044767, entitled "Apparatus and Method for Creating and Presenting Control Logic" and published as WO/2013/103382; and PCT International application No. PCT/US2012/044770, entitled "Apparatus and Method for Third Party Creation of Control Logic" and published as WO/2013/103383;

are being filed on the same date as the present application, the contents of which are incorporated herein by reference in their entireties.

BACKGROUND OF THE INVENTION

Field of the Invention

The subject matter disclosed herein relates to the synchronization of control logic between various portions of a network-based system.

Brief Description of the Related Art

Automated devices perform various functions and these devices typically include a controller or control device that controls or manages the execution of these functions. For example, robotic controllers (e.g., those that utilize microprocessors) often control the functions of a robot and the robot can perform various manufacturing tasks. Assembly line controllers are used to control the various functions performed on or at an assembly line. A consumer device controller may be used to control the operation and functioning of any type of consumer device (e.g., a washer, dryer, dishwasher, building security system, building lighting system, building heating system, conveyer, boiler, extruder, pump, valve, control arm, or microwave oven). Together, these types of controllers provide automated functions and are generally referred to as automation controllers.

An automation controller typically includes and utilizes control logic to perform its functions. Control logic may include computer software and/or computer hardware that performs various predetermined functions. For example, an assembly line controller (e.g., for a bottling plant) may include a microprocessor that operates programmed computer software to regulate the speed and other functions associated with operating an assembly line that fills and caps the bottles. In another example, a controller may also include a microprocessor running programmed computer software that regulates various device parameters (e.g., temperature, pressure, or operating speed). In yet another example, a water system controller may include control logic that controls pumps and sprinklers.

Synchronization typically ensures that instances of the same parameters or code that are maintained at different system locations are identical. Conventional control logic systems do not maintain multiple versions of these items, so there is no need for synchronization between multiple versions of these items.

BRIEF DESCRIPTION OF THE INVENTION

Approaches are provided whereby synchronization is achieved between the control logic at an automation controller and a representation of this logic at a communication network. Control logic is initially deployed to an automation controller and a representation or model of this control logic is stored at the communication network. The automation controller is located remotely (i.e., is physically distinct and separated from) the network.

When a change is made to the representation of the control logic at the network, the control logic is re-deployed to the automation controller so that the operation of the control logic at the automation controller is synchronized to the representation at the communication network. One technical effect is that the synchronization is effective to allow a service center to remotely service the control logic at the automation controller without the need to travel to the automation controller. The control logic may be any combination of hardware and/or software, and in some embodiments may utilize software library routines.

Settings at the automation controller can also be synchronized to their representations at the network. A technical effect of the synchronization of the settings, for example, allows for reliable testing of the control logic to be performed at the communication network since the settings at both locations are the same. In systems where settings are not used or are not critical, setting synchronization need not be performed.

In some aspects, the customer order is received via a graphical user interface. In other aspects, the customer order describes a plurality of control elements and interaction of selected ones of the plurality of control elements.

The automation controller may be a wide variety of devices. For instance, the automation controller may be a robot controller, an assembly line controller, or a consumer device controller. In other aspects, the automation controller may be an emulated controller or a physical controller. Other applications of controllers and implementations of controllers are possible.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Approaches are provided whereby the control logic at an automation controller is synchronized to a control logic representation stored at a communication network that is separate from and remotely located from the automation controller. The settings of the automation controller may also be synchronized to copies of the settings maintained at the communication network. By synchronizing these elements, reliable testing can be performed at the communication network since the multiple versions of these elements are identical. One of the benefits of the present approaches is that changes to the control logic can be reliably made since the multiple versions of these elements are identical. Other advantages will become apparent in view of the following discussion.

Figure 1:
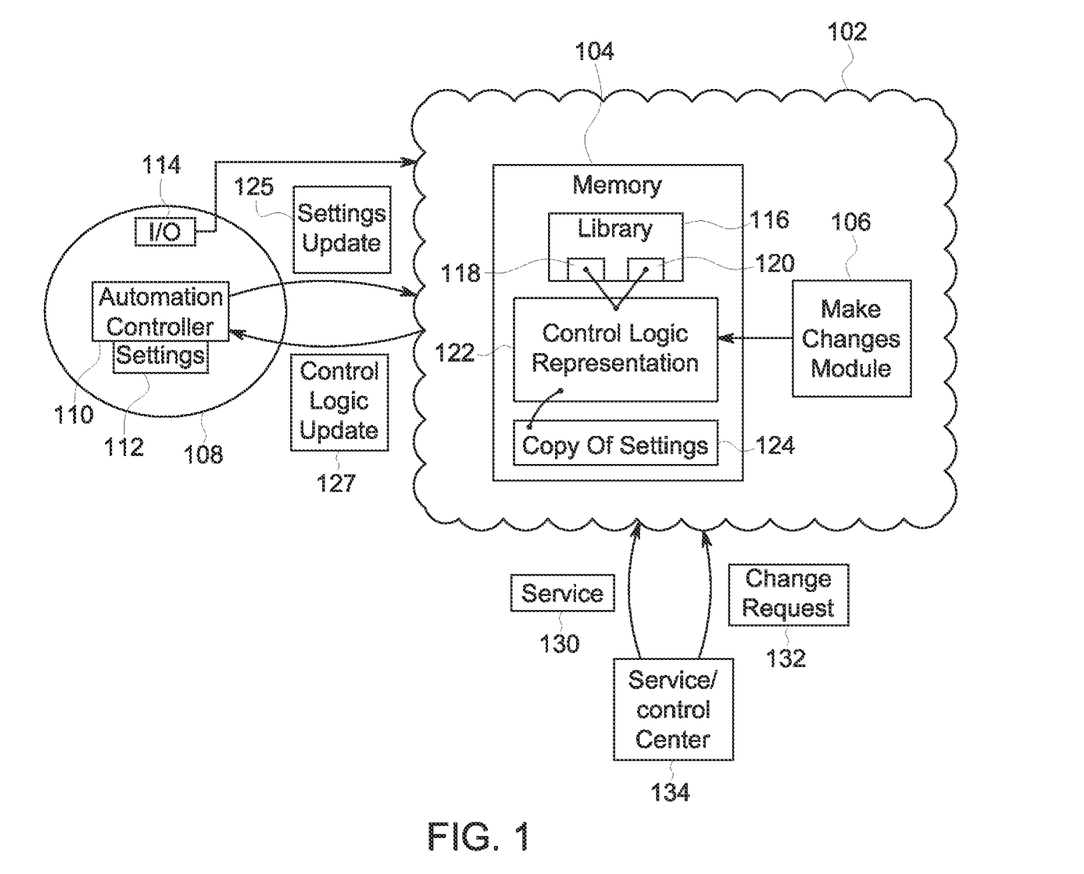
FIG. 1 comprises a block diagram of a communication network that synchronizes control logic according to various embodiments of the present invention.

Referring now to FIG. 1, one example of a system for synchronizing multiple instances of control logic is described. A communication network 102 includes a memory unit 104, and a make changes module 106. The network 102 is coupled to a site 108 that includes an automation controller 110 (with settings 112) and interface 114. The site 108 may be any site where an automation controller can be deployed such as at a consumer device, at a factory, in an office, or at a communication device (e.g., base station) to mention a few examples.

The communication network 102 may be any type of communication network or combination of networks. For example, the communication network 102 may be the Internet, a cloud network, a telecommunication (e.g., cellular) network or any combination of these or other networks.

The memory unit 104 is any type of memory device or combination of memory devices. The memory unit 104 as well as the other elements of the communication network 102 may physically reside on any type of device or devices such as servers, access points, computers, interfaces of any type, or any other type of network element.

The memory unit 104 includes a library 116 with library elements or modules 118 and 120, a control logic representation 122, and copy of settings 124.

The control logic representation 122 is a description (in one example, implemented as programmed computer software or code) that represents the control logic at the automation controller 110. The control logic representation 122 describes the functions, workings, operation, inputs, outputs, and other characters of the operation of the associated automation controller 110.

The control logic representation 122 uses modules 118 and 120 from the library 116. In this respect, the modules 118 and 120 may be programmed software modules that perform specified functions. Although only two modules 118 and 120 are shown, it will be appreciated that any number of modules may be used. Further, it will be understood that different control logic representations may share modules.

As mentioned, the library 116 includes modules 118 and 120. Alternatively, a third party can create the entire control logic 122 (without the modules 118 and 120). In other aspects, a third party can create pieces of different types of logic (e.g., the same type of control logic for different automation controllers or different types of control logic for the same automation controller).

Automation controller 110 may be any device, combination of devices, or network of devices that are implemented in any combination of hardware or software. In one example, the automation controller 110 is an assembly line controller. In other examples, the automation controller is a controller for a pumping network (e.g., pumps, valves, pipes, sprinklers, and their associated controllers). Other examples of automation controllers and systems that utilize automation controllers are possible.

The interface 114 is any type of interface device that interacts with a human such as a personal computer, a laptop, a cellular telephone, or a personal digital assistant. Other examples of interfaces are possible. The interface 114 provides input and output functions as shown in the figure.

The make changes module 106 accepts a change request 132 to be made to the control logic representation 122. A service control center 134 may request a change to the control logic representation 122 or provide other service 130 to the control logic representation 122. In other aspects, the change request 132 may originate with other third parties or from the customer (e.g., entering the change via the interface 114). The change request 132 generally describes (via any appropriate software command or structure) the change requested to be made the control logic representation 122 (and hence to the control logic at the automation controller). The service 130 may, for example, involve monitoring the control logic representation 122.

Multiple versions of the control logic representation 122 may be maintained at the communication network 102. This may be advantageous in many situations where similar automation controller use different versions of the control logic. For example, a first pump of a first customer may use a first and original version of the control logic. For cost reasons, the owner of the first pump does not wish to utilize a second (and revised or improved) version of the control logic that includes new features. However, a second customer does desire to utilize the second version of the control logic in a second pump that the second customer owns. Representations of the first version of the control logic and the second version of the control logic are both maintained at the communication network 102. Thus, one technical effect is that both customers have access to the control logic they desire or require.

In one example of the operation of the system of FIG. 1, synchronization is achieved between control logic at an automation controller 110 and control logic representation 122 at a communication network. Control logic is initially deployed to the automation controller 110 and this control logic representation 122 is stored at the communication network 102. The automation controller 110 is located remotely (i.e., is not part of and/or is physically separated by a substantial distance from) the network 102.

When a change request 132 is sent to make a change to the control logic representation 122 at the network 102, the change is made and the control logic is re-deployed via update 127 to the automation controller 110 so that the operation of the control logic is synchronized to the control logic representation 122. The synchronization is effective to allow a service center 134 to engage in remote service 130 of the control logic without the need for traveling to the automation controller 110 in order to service the automation controller 110.

Settings 112 at the automation controller can also be synchronized to their representations at the network by sending a settings update 125 to the network 102. Settings may include various parameter values (e.g., pressures, temperatures, operating speeds) associated with the automation controller 110.

Figure 2:
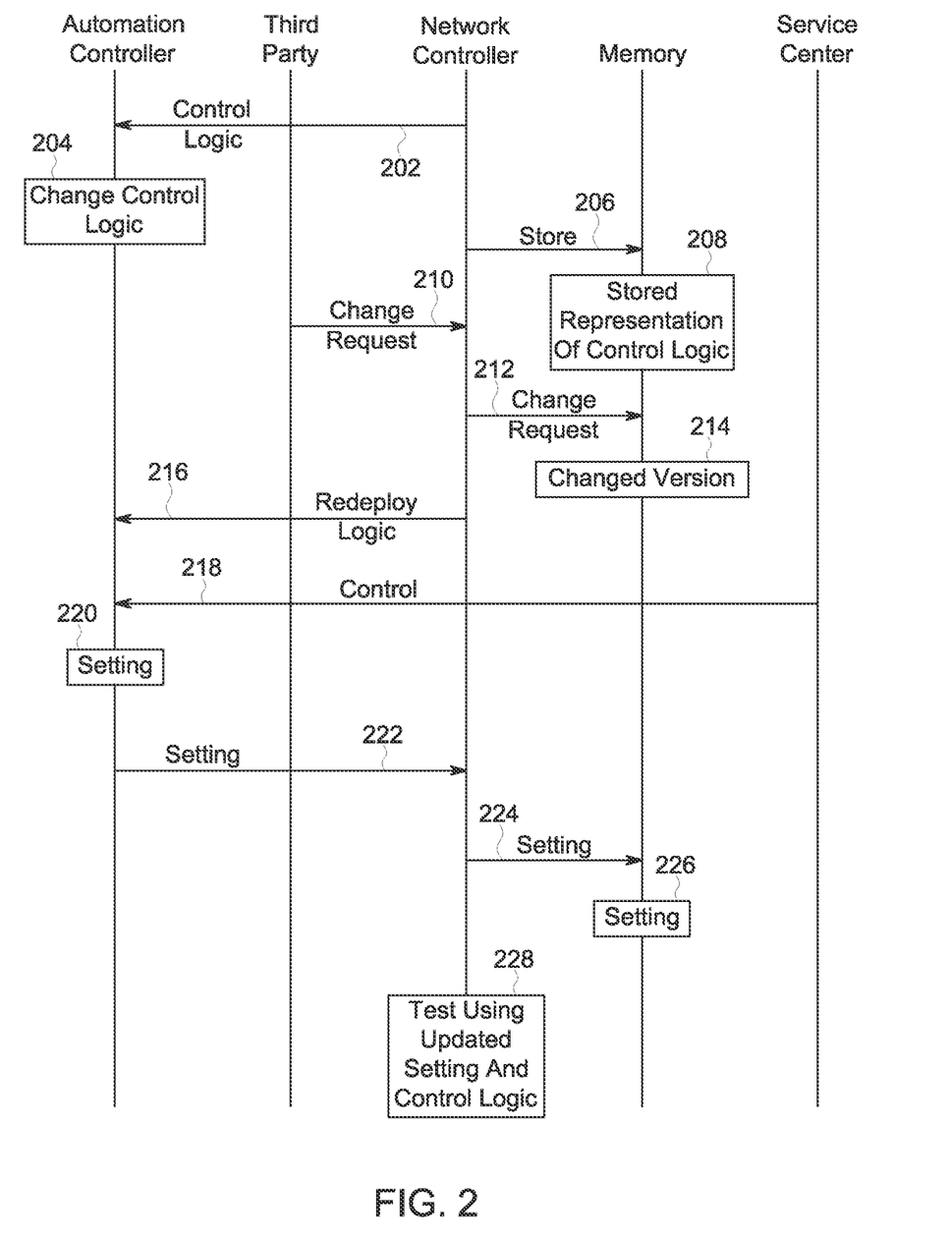
FIG. 2 comprises a flow chart showing an approach for the synchronization of control logic according to various embodiments of the present invention.

Referring now to FIG. 2, one example of an approach for achieving synchronized control logic is illustrated according to the present approaches. At step 202, control logic is initially deployed from the network controller to an automation controller. The deployment may be accomplished by a communication medium such as the Internet. At step 204 the control logic change is stored at the automation controller. The change may occur at any time after the control logic is initially deployed. At step 206, a representation (copy) of the control logic is sent to a memory at the communication network, and at step 208, the control logic representation is stored in memory at the communication network.

At step 210, a change request (requesting a change be made to the control logic) is transmitted by a third party and this change request 212 results in the creation of a changed version 214 of the control logic in the memory at the communication network. It will be appreciated that the original control logic representation may be overwritten or multiple versions of the control logic may be stored at the communication network. The later approach is particularly advantageous when similar automation controllers utilize different versions of the control logic so that all controllers have the control logic they require. In another approach, the original representation is always preserved and changes will be versioned.

At step 216, the control logic is re-deployed to the automation controller. At step 218, some control action is performed to the control logic representation stored at the communication network by a remote service center without the service center personnel having to travel to the actual site of the automation controller.

At step 222, a setting update reflecting settings 220 is sent from the automation controller to the network controller. At step 224, this is stored in memory at the communication network as settings 226.

At step 228, a test can be performed using updated settings and control logic. Since the instances of these elements at the automation controller and the communication network are identical, the test is reliable in that it will accurately reflect the operation of the control logic at the automation controller.

Figure 3:
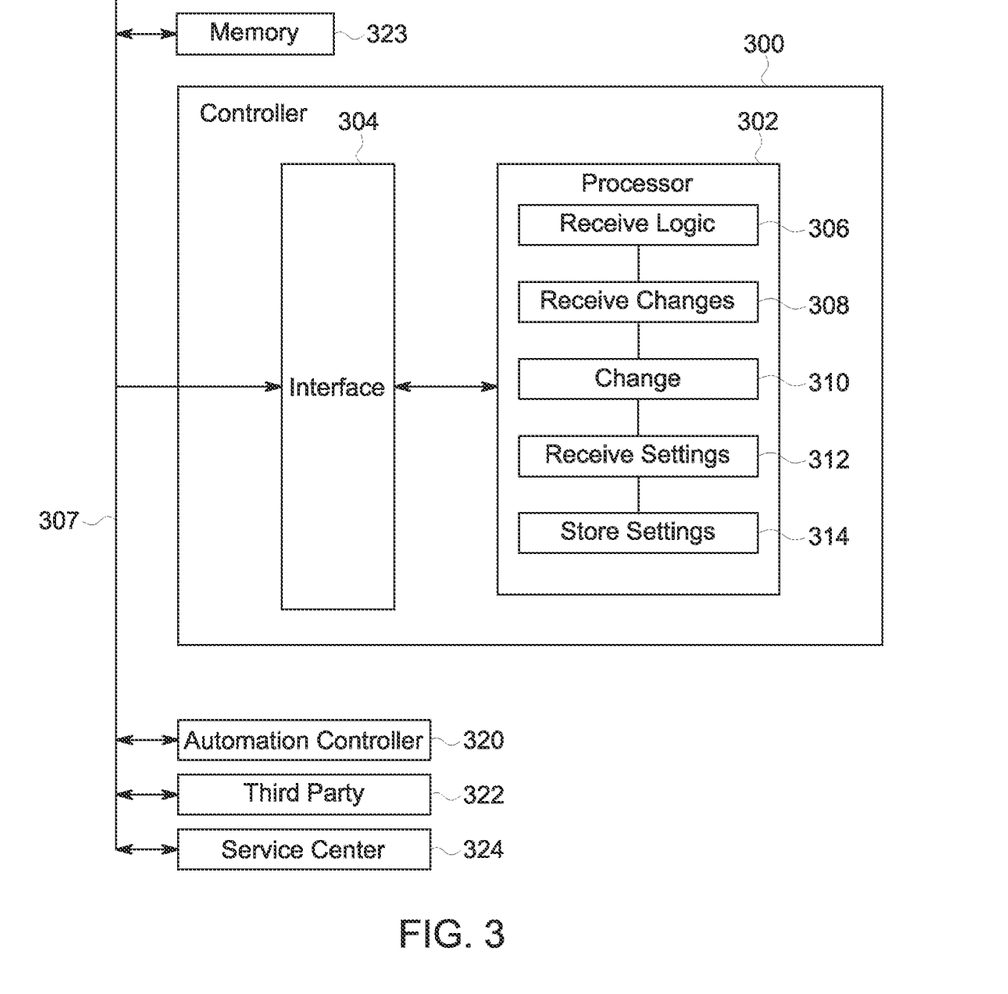
FIG. 3 comprises a block diagram of a network controller according to various embodiments of the present invention.

Referring now to FIG. 3, one example of a communication network controller 300 is described. The controller 300 includes a processor 302 and an interface 304. The processor 302 includes a receiver logic module 306, a receive changes module 308, a change module 310, a receive settings module 312, and a store settings module 314. The interface 304 is coupled to communication medium 307. Communication medium 307 is coupled to automation controller 320, third party 322 (e.g., a third party control logic provider), a memory 323, and a service center 324 (e.g., a service provider that services control logic).

The receive logic module 306 receives a representation of control logic for storage in the network at the memory 323. The receive changes module 306 receives changes from a third party 322 (via communication medium 307) and utilizes change module 310 to make changes to the control logic. The change module 310 performs all actions to implement the changes to the control logic (including creating a new version of the control logic).

The receive settings module 320 receives settings from automation controller 320 (via the communication medium 307) and the store settings module 314 stores these settings at the network (e.g., at a memory). Consequently, the same values for the settings are maintained at the automation controller 320 and the communication network. In systems where settings are not used or are not critical, setting synchronization need not be performed.

The service center 324, in one example, sends change requests to the controller 300. The changes are made to the control logic and the modified control logic is transmitted to the automation controller 320. Thus, synchronization of multiple instances of the control logic is maintained. In one aspect, a new (changed) version of the control logic is maintained and stored at the communication network while in others only a single version of the control logic is maintained.

The medium 307 may be any type of communication medium (hard wires, over the air, the Internet to mention a few examples). The interface 304 provides formatting and control functions between the processor 302 and the communication medium 307. The processor 302 is any processing device such as a microprocessor or the like. The controller 300 may be incorporated into or a part of any device such as an access point, server, base station, to mention a few examples.

Figure 4:
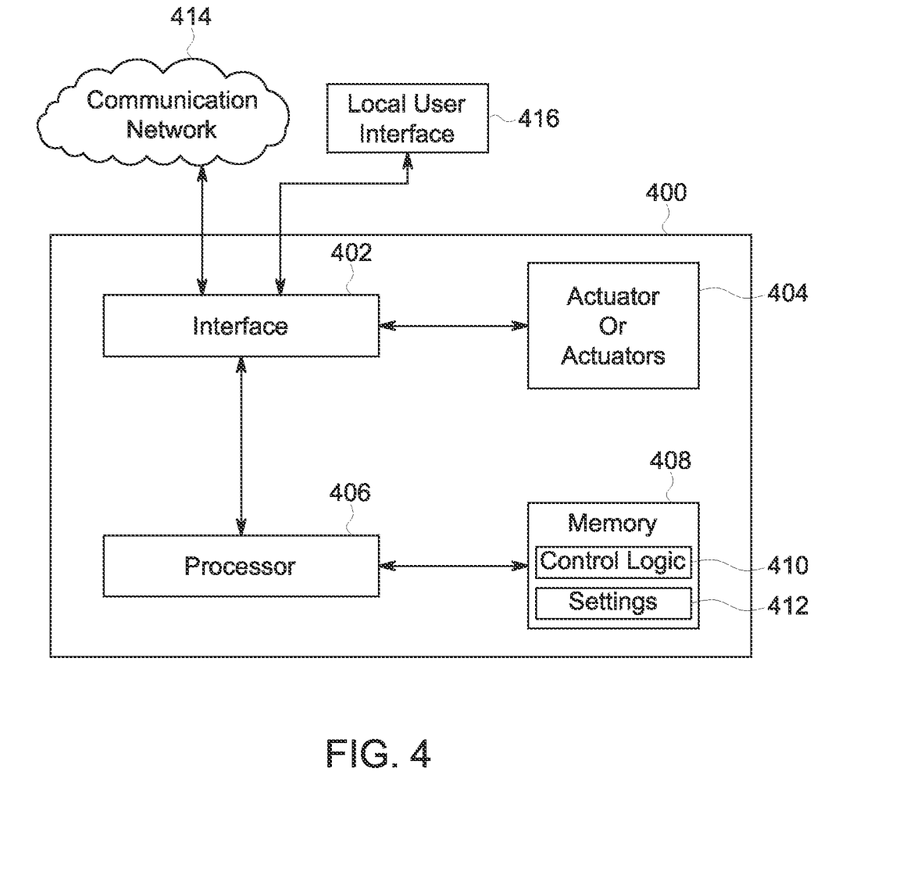
FIG. 4 comprises a block diagram of an automation controller according to various embodiments of the present invention.

Referring now to FIG. 4, one example of an automation controller 400 is described. The automation controller 400 includes an interface 402, one or more actuators 404, a processor 406, and a memory 408 (that includes control logic 410 and settings 412).

The interface 402 facilitates communications between the automation controller 400 and a communication network 414, and between the automation controller 400 and a local user interface 416. In this respect, the interface 402 includes hardware and/or software that interprets or translates commands and/or other information between the communication network 414 and the automation controller 400, and between the automation controller 400 and the local user interface 416.

The actuators 404 actuate physical or logical devices (e.g., the mechanical components of a valve or a sprinkler motor, to mention two examples). The function of the actuators 404 is to physically implement one or more of the functions associated with or provided by the controller 400.

The processor 406 is any programmed logic device such as a microprocessor or the like. Control logic 410 implements control functions that control actuators 404. Settings 412 are settings or other parameters (e.g., valve levels, pressures, temperatures, speeds) for the actuators 404.

Local user interface 416 may be a personal computer, cellular phone, or any other device that communicates with network 414 and/or controller 400. The communication network 414 is the location where the control logic 410 is built.

In one example of the operation of the system of FIG. 4, the control logic 410 at the automation controller 400 is synchronized with a representation of the control logic that is maintained at the communication network 414. The settings 412 at the automation controller 400 are also synchronized with a copy of the settings maintained at the communication network 414. In systems where settings are not used or are not critical, setting synchronization need not be performed.

Preferred embodiments of this invention are described herein, including the best mode known to the inventors for carrying out the invention. It should be understood that the illustrated embodiments are exemplary only, and should not be taken as limiting the scope of the invention.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method of synchronizing information for an automation controller with a representation of the information stored at a communication network, the automation controller being located remotely from the communication network, the method comprising:
    initially deploying control logic to an automation controller;
    deploying and storing a change to the control logic at the automation controller;
    sending a representation of the control logic including the change to the communication network;
    storing the representation of the control logic including the change at the communication network;
    receiving a change request from a third party at the communication network for a requested change to be made to the control logic for the automation controller;
    creating a changed version of the control logic at the communication network by changing the representation of the control logic to include the requested change;
    in response to creating the changed version of the control logic, re-deploying the changed version of the control logic to the automation controller so that the operation of the control logic at the automation controller is synchronized with the changed representation of the control logic at the communication network; and
    servicing, from a service center located remotely from the automation controller and the communication network, the changed version of the control logic at the communication network,
    wherein the communication network comprises the Internet, and wherein the steps of deploying, re-deploying, sending, and receiving include communicating information over the Internet.

2. The method of claim 1 further comprising: transmitting setting information associated with the automation controller from the automation controller to the communication network and storing a representation of the setting information at the communication network, the transmitting and storing of the representation being effective to synchronize the setting information of the automation controller with the representation of the setting information at the communication network.

3. The method of claim 1, wherein a customer order is received via a graphical user interface.

4. The method of claim 1, wherein a customer order describes a plurality of control elements and interaction of selected ones of the plurality of control elements.

5. The method of claim 1, wherein the controller selected from the group consisting of a robot controller, an assembly line controller, and a consumer device controller.

6. The method of claim 1, wherein the automation controller is selected from the group consisting of an emulated controller and a physical controller.

7. The method of claim 1, wherein the control logic utilizes library routines.

8. The method of claim 1, further comprising downloading the control logic to the automation controller.

9. The method of claim 1, wherein multiple versions of the representation of the control logic are stored at the communication network.

10. An apparatus residing at a communication network, the apparatus for synchronizing information at an automation controller with representation of the control logic at the communication network, the automation controller being remotely located from the communication network, the apparatus comprising:
    an interface having an input and an output;
    a memory;
    a processor coupled to the memory and the interface, the processor configured to:
        receive and store a representation of control logic deployed on an automation controller;
        receive a change request from a third party for a requested change to be made to the control logic for the automation controller;
        create a changed version of the control logic at the communication network by changing the representation of the control logic to include the requested change;
        in response to creating the changed version of the control logic, re-deploy the changed version of the control logic to the automation controller via the output so that the operation of the control logic at the automation controller is synchronized to the changed representation of the control logic; and
        allow a service center located remotely from the automation controller and the communication network to service the changed version of the control logic,
        wherein the communication network comprises the Internet, and wherein at least the steps of receiving and re-deploying include communicating information over the Internet.

11. The apparatus of claim 10, wherein setting information from the automation controller is transmitted to the communication network.

12. The apparatus of claim 10, wherein the controller is selected from the group consisting of: a robot controller, an assembly line controller, and a consumer device controller.

13. The apparatus of claim 10, wherein the automation controller is selected from the group consisting of an emulated controller and a physical controller.

14. The apparatus of claim 10, wherein the control logic utilizes library routines.

15. The apparatus of claim 10, wherein the control logic is sent to the automation controller via the Internet connection.

16. The apparatus of claim 10, wherein multiple versions of the representation of the control logic are stored at the communication network.

* * * * *